United States Patent [19]

Hasquenoph et al.

[11] 4,056,248
[45] Nov. 1, 1977

[54] TWO-PURPOSE HOOK FOR AIRCRAFT LOAD CARRIERS

[75] Inventors: Jean H. Hasquenoph, Lagny-sur-Marne; Pierre Fernand Coutin, Paris, both of France

[73] Assignee: R. Alkan & Cie, France

[21] Appl. No.: 701,708

[22] Filed: July 1, 1976

[30] Foreign Application Priority Data

July 1, 1975  France ........................ 75.20577

[51] Int. Cl.² ............................................. B64D 1/02
[52] U.S. Cl. .............................. 244/137 R; 89/1.5 G; 294/83 R
[58] Field of Search ............. 294/82 R, 83 R, 83 AB, 294/81 R, 81 SF; 24/230.5 AD, 230.5 PA, 230.5 TD, 232; 89/1.5 R, 1.5 G, 1.5 H; 105/366 C; 244/137 R; 248/119 R

[56] References Cited

U.S. PATENT DOCUMENTS

| 2,278,482 | 4/1942 | Pishvanov .......................... 89/1.5 G |
| 3,262,729 | 7/1966 | Willison et al. ............... 294/83 R X |
| 3,762,754 | 10/1973 | Goyarts ........................ 294/81 SF X |
| 3,927,622 | 12/1975 | Voigt ............................. 105/366 C X |
| 3,954,233 | 5/1976 | Hasquenoph et al. ........... 244/137 R |

*Primary Examiner*—Johnny D. Cherry
*Attorney, Agent, or Firm*—William Anthony Drucker

[57] ABSTRACT

A system for securing under an aircraft a jettisonable load having either a known suspension ring or a known suspension bridge with laterally spaced recesses. The carrier structure on the aircraft includes a withdrawable pivot pin for supporting a hook which can be removed and turned through 180° for presenting optionally a single projection to engage with a suspension ring, or a pair of abutments to engage in the recesses of a suspension bridge. The hook is releasably angularly coupled to an actuating shank pivotable about the pin.

3 Claims, 4 Drawing Figures

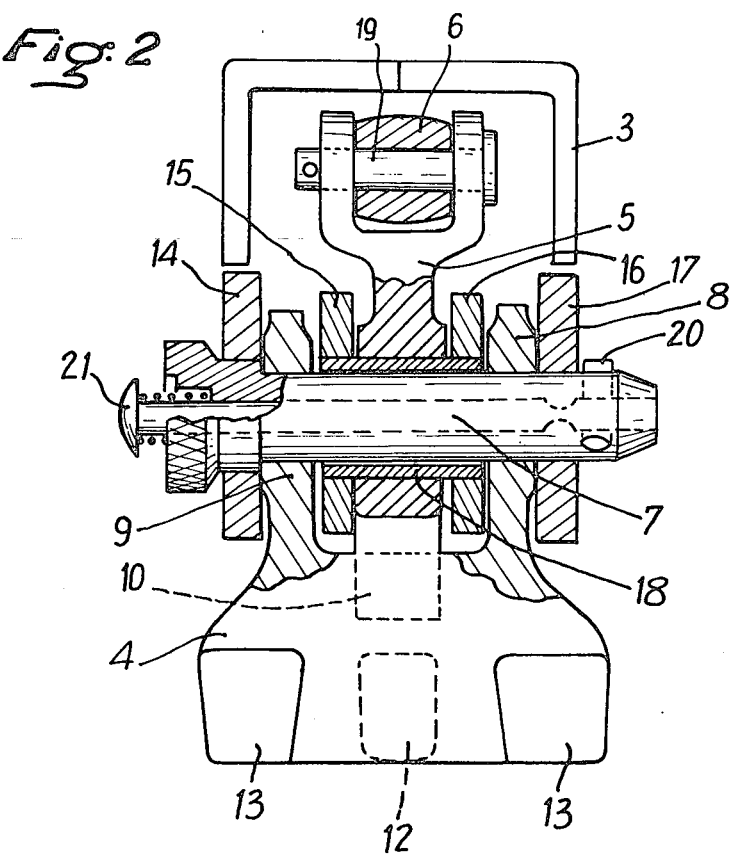
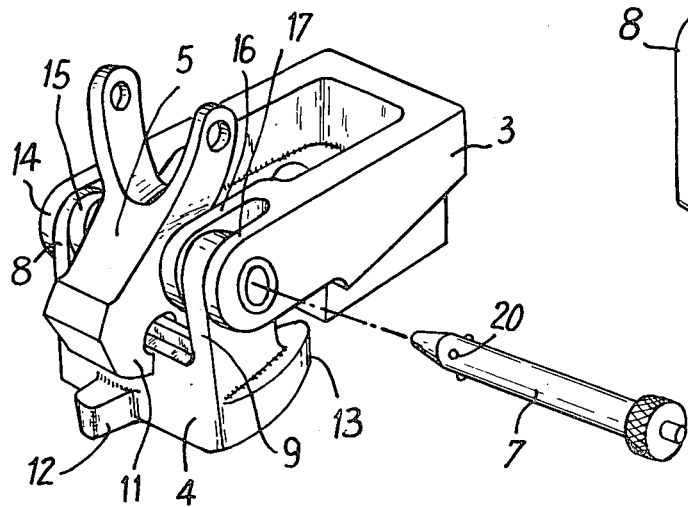

TWO-PURPOSE HOOK FOR AIRCRAFT LOAD CARRIERS

BACKGROUND OF THE INVENTION

1. Field of the Invention

This invention relates to improvements in or relating to two-purpose hooks for carrying loads under aircrafts.

2. Description of the Prior Art

As a rule, loads carried by the understructure of aircrafts comprise so-called brique members, anchoring hooks or ring suspension members or loops, as disclosed in the U.S. Pat. Nos. 3,840,201 and 3,954,233.

SUMMARY OF THE INVENTION

It may happen that loads provided with one or the other suspension means have to be transported by utilizing the same releasable or jettisoning devices permanently mounted on an aircraft, and it is the essential object of this invention to provide such releasable load-carrying device which is particularly simple to manufacture and capable of carrying loads of both types by means of two-purpose hooks.

According to this invention, each hook equipping the load-carrying device comprises on one side a central projection capable of engaging a standard ring rigid with the load to be carried, and on the opposite side a pair of spaced lateral projections engageable in a pair of recesses formed in a bridge-like member rigid with the load to be carried. Since the jettisoning mechanism of conventional type engages only one side of the hook, it is clear that it is only necessary to so mount the above-mentioned hook on its pivot pin that it can easily be turned the other way for switching when necessary and without difficulty from the fastening of a load equipped with a ring to the fastening of of a load equipped with a bridge, and vice versa.

BRIEF DESCRIPTION OF THE DRAWING

FIG. 2 is a fragmentary vertical section of the same device;

FIG. 3 is a perspective view showing the portion of the releasable suspension device incorporating the hook according to the invention, and FIG. 4 is a perspective view of the hook of the device of FIG. 3.

DESCRIPTION OF THE PREFERRED EMBODIMENT

Figure 1:
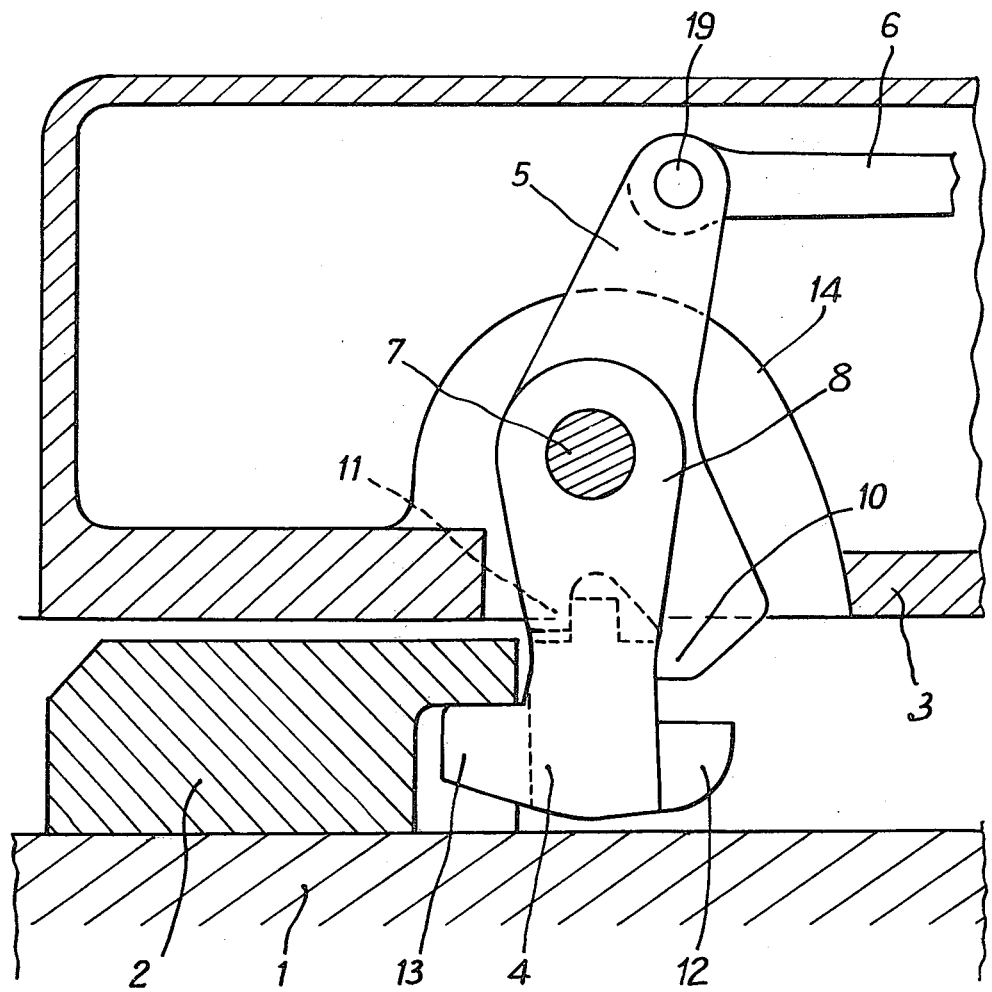
FIG. 1 is a vertical section illustrating the hook in side elevational view, this hook being shown while in engagement with the bridge member or like fitting rigid with a load to be jettisoned.

In FIG. 1 the reference numeral 1 designates the load to be carried and jettisoned, which comprises a bridge member 2, and the reference numeral 3 designates the carrier device of which the mechanism already known per se, is not illustrated. The detachable hook member proper is shown at 4 and the shank 5 thereof, which is to remain in position, is connected through a rod 6 to said mechanism (not shown) controlling the hook movements.

The two members 4, 5 of the device are carried by a transverse pivot pin 7 and in the example illustrated it is assumed that the hook 4 comprises a pair of integral lateral lugs 8, 9 disposed on said pivot pin 7 on each side of the shank 5 comprising a pair of spaced depending heels 10, 11 extending over the central portion of the body of hook 4 in order to prevent any relative rotational movement between said hook 4 and its shank 5. On the inoperative side in its position shown in FIG. 1 the hook 4 carries a central projection 12 adapted to engage a load suspension ring when the hook is in the position obtained when the hook 4, considered initially in the position illustrated in FIG. 1, is removed from the pivot pin 7 and re-inserted thereon after turning said hook 4 the other way. On the opposite side, i.e. on the operative side in the position shown in FIG. 1, the hook 4 carries a pair of spaced lateral projections 13 adapted to engage the pair of corresponding recesses of bridge member 2.

The fixed elements of the carrier device which are necessary for a clear understanding of this invention are illustrated more in detail in FIG. 2 and comprise webs 14, 15, 16, 17 rigid with the structure of the carrier device 3 and formed with aligned holes engageable by the pivot pin 7 passing with play through a central bushing 18 rigid with the pair of central webs 15, 16 between which the hook shank 5 is rotatably mounted on said bushing 18, the lateral lugs 8, 9 of said hook 4 being rotatably mounted on the pivot pin 7 proper, that is, with one lug 8 between webs 16 and 17, and the other lug 9 between the other pair of webs 14 and 15. Furthermore, the hook shank 5 is pivotally connected to the control rod 6 by means of a pin 19.

The detachable pivot pin 7 comprises radial locking means in the form of bolts 20 adapted to be actuated manually by means of an internal axial push-rod 21 against the resistance of a spring, whereby the radial lock bolts 20 can be retracted by engaging an annular groove formed in said push rod for releasing the pivot pin 7, so that the latter can be removed from its bearings consisting of webs 14 to 17 for turning the hook 4 the other way whereafter the pivot pin 7 can be re-inserted in position.

The structure contemplated for the hook 4 and shank 5 is clearly illustrated in FIGS. 3 and 4.

Of course, various modifications and changes may be brought to the specific form of embodiment of the invention which is shown in the drawing and described hereinabove, without departing from the basic principles of the invention as set forth in the appended claims.

What we claim is:

1. In a system for securing, under an aircraft, a jettisonable load having selectively a suspension ring and a suspension bridge with laterally spaced recesses, in combination:

i. a carrier structure, for mounting on the aircraft, including a horizontal transverse pivot pin releasably engaged therein, ii. a shank having a first end and a second end, said first end being freely rotatably journalled on said carrier structure, said second end being adapted for connection to means for moving the shank angularly into a holding position and into a releasing position, iii. a hook member having a first end and a second end, said first end being freely rotatably journalled on said pivot pin, said second end having thereon a single element projecting in a radial plane from one side of the hook member and adapted for engagement in a suspension ring, said second end having thereon a pair of axially spaced abutments projecting in a radial plane from the opposite side of the hook member and adapted for engagement in the laterally spaced recesses of a suspension bridge, said shank and said hook member having portions abutting such that said shank and said hook member are coupled for angular movement about the axis of the pivot pin.

2. The combination of claim 1, wherein said carrier structure comprises a first axially spaced pair of webs each having an aperture, said apertures being aligned, a bushing secured in said apertures and receiving said pivot pin, and a second pair of axially spaced webs positioned in spaced relationship at each side of said first pair of webs, the webs of said second pair each having an aperture, said apertures being aligned with said bushing and receiving said pivot pin, said shank being journalled on said bushing.

3. The combination of claim 2, wherein said first end of said hook member includes a pair of axially spaced lugs, each said lug having an aperture, said apertures being aligned and receiving said pivot pin freely rotatable therein, one of said lugs being disposed between one of the first pair of webs and one of the second pair of webs, and the other of said lugs being disposed between the other of said first pair of webs and the other of said second pair of webs.

* * * * *